(12) United States Patent
Liu et al.

(10) Patent No.: US 7,525,532 B2
(45) Date of Patent: Apr. 28, 2009

(54) POINTING DEVICE

(76) Inventors: Sen-Hsiang Liu, No. 669, Ruey Kuang Road, Taipei (TW) 114; Huang-Feng Huang, No. 669, Ruey Kuang Road, Taipei (TW) 114; Hai-Bing Fu, No. 669, Ruey Kuang Road, Taipei (TW) 114

( * ) Notice: Subject to any disclaimer, the term of this patent is extended or adjusted under 35 U.S.C. 154(b) by 659 days.

(21) Appl. No.: 11/203,691

(22) Filed: Aug. 15, 2005

(65) Prior Publication Data
US 2006/0290672 A1 Dec. 28, 2006

(30) Foreign Application Priority Data
Jun. 24, 2005 (TW) .............................. 94121114 A

(51) Int. Cl.
*G09G 5/00* (2006.01)
(52) U.S. Cl. ..................................... 345/156
(58) Field of Classification Search .......... 345/156–167
See application file for complete search history.

(56) References Cited

U.S. PATENT DOCUMENTS

| | | | | |
|---|---|---|---|---|
| 5,428,368 A * | 6/1995 | Grant | ........................ | 345/163 |
| 5,691,747 A * | 11/1997 | Amano | ...................... | 345/167 |
| 6,198,473 B1 * | 3/2001 | Armstrong | ................. | 345/163 |
| 6,518,954 B1 * | 2/2003 | Chen | ......................... | 345/161 |
| 6,879,316 B2 * | 4/2005 | Kehlstadt et al. | ............ | 345/163 |
| 7,042,441 B2 * | 5/2006 | Adams et al. | ............... | 345/163 |
| 7,079,110 B2 * | 7/2006 | Ledbetter et al. | ............ | 345/156 |
| 7,283,122 B2 * | 10/2007 | Bohn et al. | .................. | 345/156 |
| 2001/0043149 A1 * | 11/2001 | Chan | ........................ | 341/20 |
| 2002/0158844 A1 * | 10/2002 | McLoone et al. | ........... | 345/163 |
| 2004/0001042 A1 * | 1/2004 | Lindhout et al. | ............ | 345/156 |
| 2004/0174336 A1 * | 9/2004 | Bohn | ........................ | 345/156 |
| 2004/0252107 A1 * | 12/2004 | Tsai et al. | .................... | 345/163 |
| 2005/0162404 A1 * | 7/2005 | Chiu et al. | .................. | 345/173 |
| 2005/0179655 A1 * | 8/2005 | Ludwig | ...................... | 345/157 |
| 2006/0044257 A1 * | 3/2006 | Chou | ........................ | 345/156 |
| 2006/0109246 A1 * | 5/2006 | Lee et al. | .................... | 345/163 |
| 2006/0290655 A1 * | 12/2006 | Chou | ........................ | 345/156 |
| 2007/0159462 A1 * | 7/2007 | Yen et al. | .................... | 345/163 |

\* cited by examiner

*Primary Examiner*—Sumati Lefkowitz
*Assistant Examiner*—Rodney Amadiz
(74) *Attorney, Agent, or Firm*—Workman Nydegger

(57) ABSTRACT

A pointing device is communicated with a computer system for controlling movement of a cursor shown on a display screen of the computer system. The pointing device includes a housing and a scroll wheel assembly. The housing has an opening therein. The scroll wheel assembly is positioned within the opening of the housing and a portion thereof protrudes away from the outer surface of the housing. The scroll wheel assembly includes a rotatable member, a soft member covering the rotatable member, and a sensing member arranged between the rotatable member and the soft member. The sensing member is actuated in response to deformation of the soft member when a lateral force is applied on the soft member, thereby controlling lateral movement of the cursor.

16 Claims, 4 Drawing Sheets

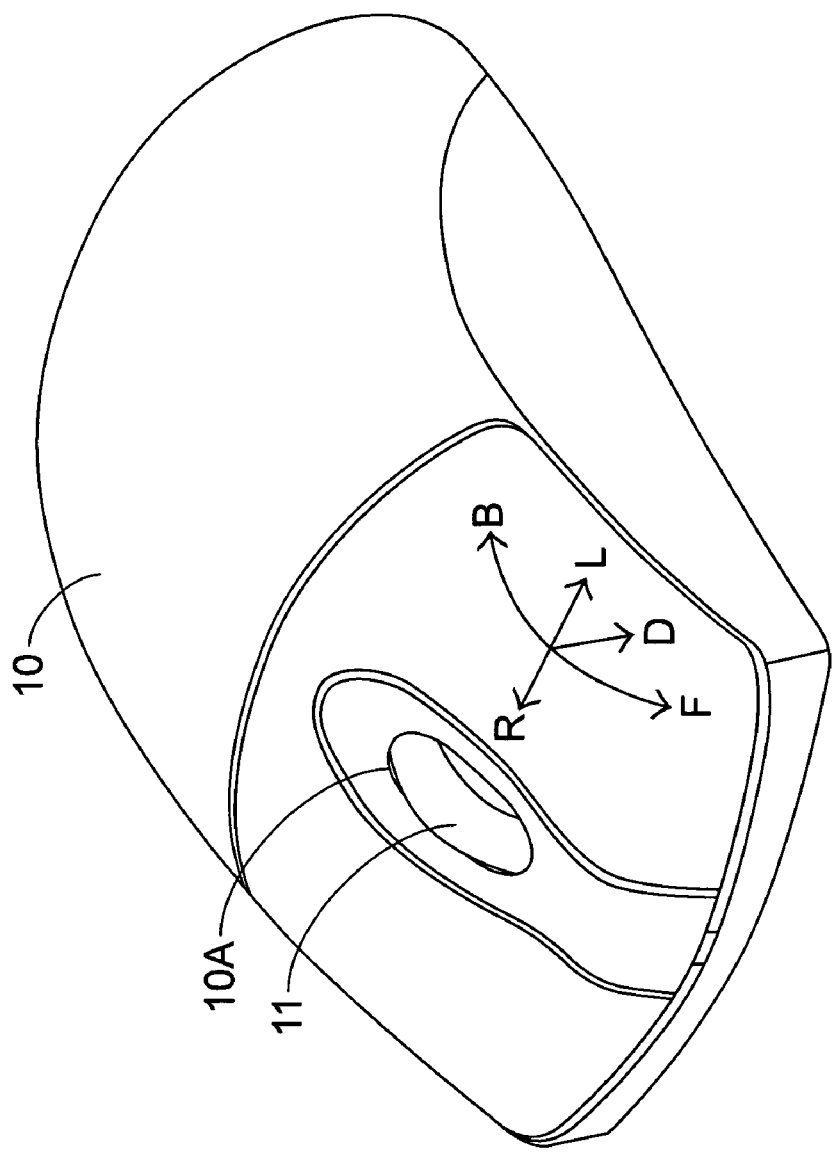

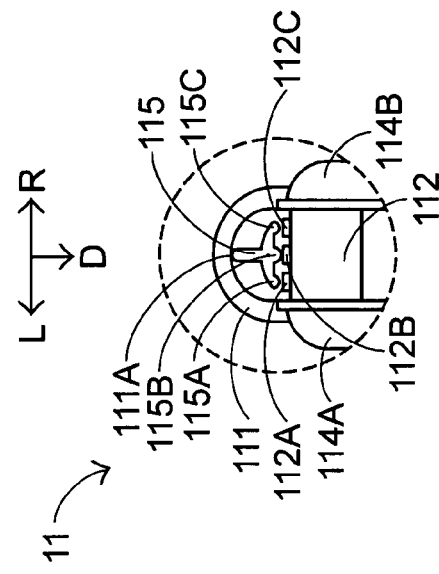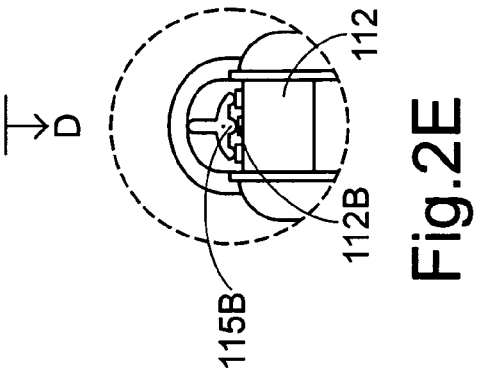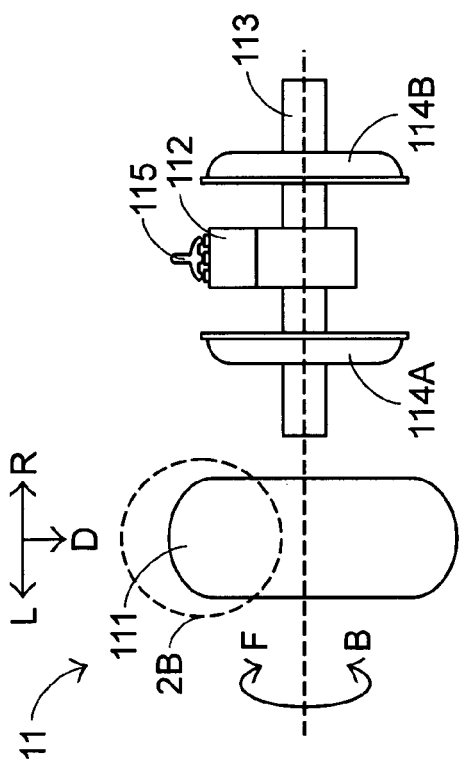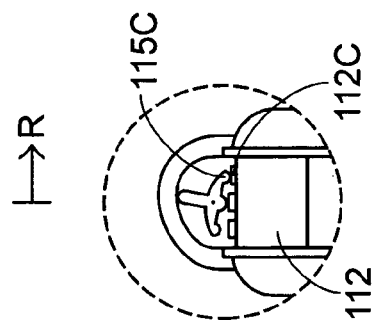

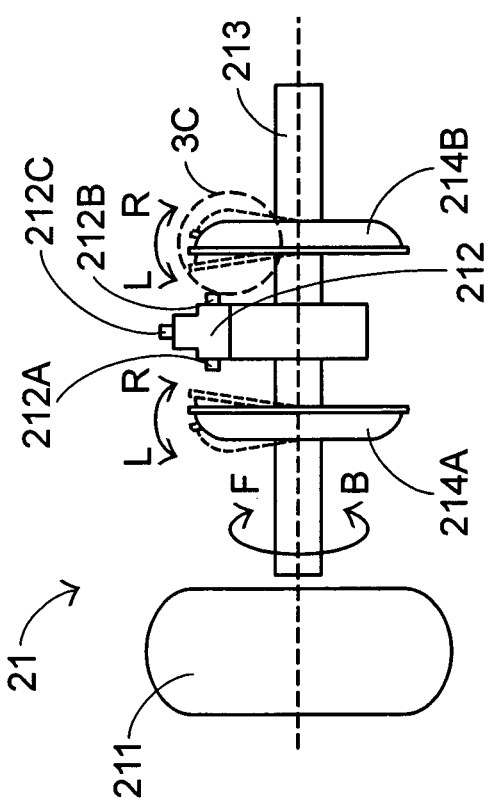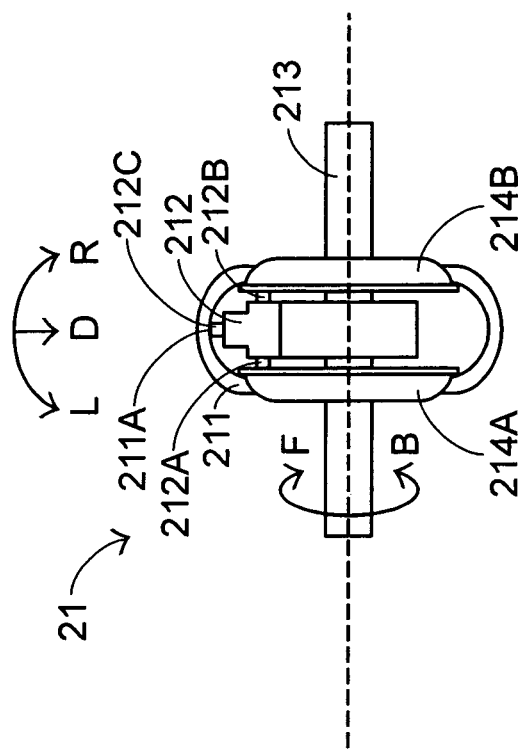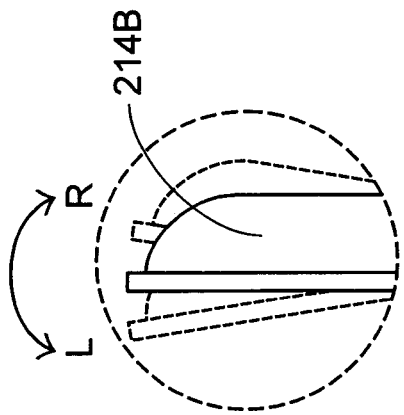

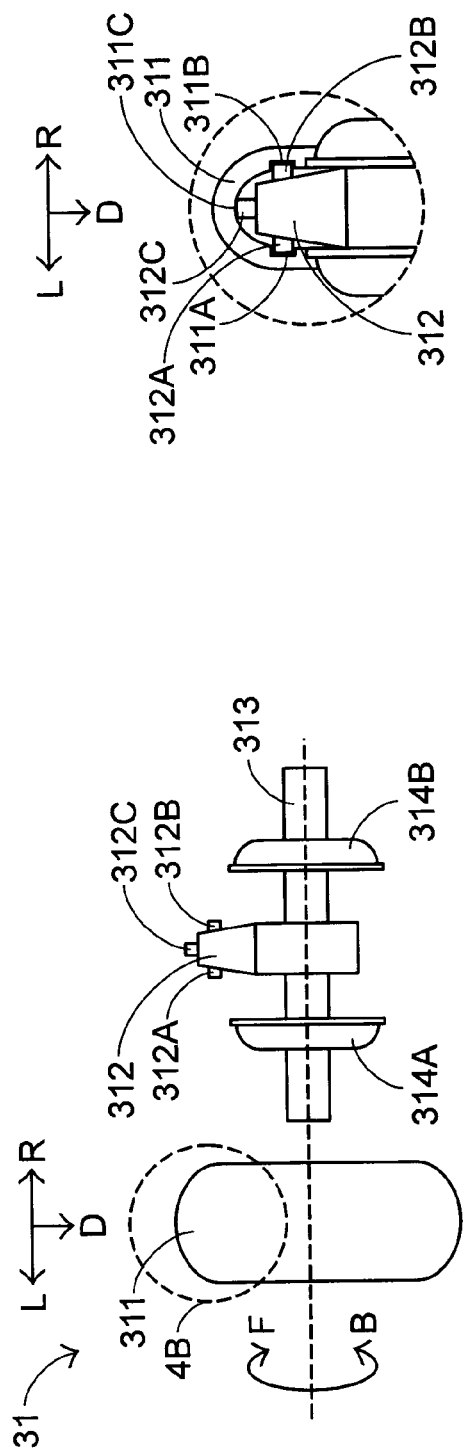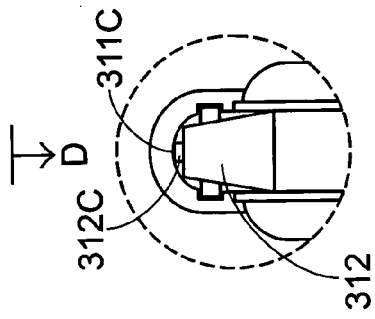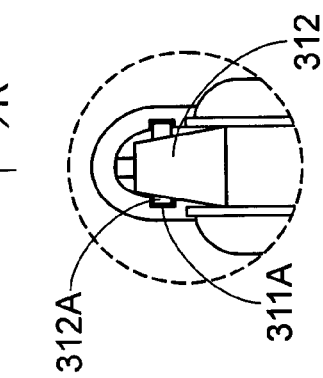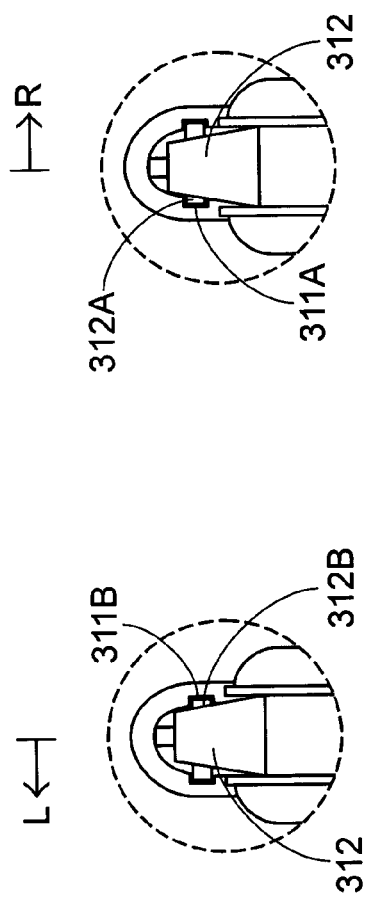

POINTING DEVICE

FIELD OF THE INVENTION

The present invention relates to a pointing device, and more particularly to a pointing device for scrolling an image on a display screen, controlling lateral movement of a cursor and generating a setting signal.

BACKGROUND OF THE INVENTION

Pointing devices such as mice have been widely employed in computer systems or other electronic apparatuses equipped with a display screen so as to control movement of a cursor on the display screen or scroll an image relative to the display screen. In addition, the pointing device may be actuated to generate responsive setting signals to conduct further data processing operations. As known, a scroll wheel assembly is usually provided on a pointing device and used by the computer operators to scroll an image relative to the display screen. Since the scroll wheel assembly is rotatable in either a forward direction or a backward direction, the image would be scrolled upwards or downwards. For a purpose of controlling movement of the cursor by the scroll wheel assembly, another type of pointing device with a sensing member on either or both sides of the scroll wheel assembly was developed. An example of the sensing member is a strain gauge. By laterally stirring the scroll wheel assembly, the sensing member is actuated to generate a control signal. In response to the control signal, the cursor shown on the display screen would be located to move in the left or right direction accordingly.

This pointing device, however, has several drawbacks. For example, since the sensing member is typically arranged on bilateral sides or peripheries of the scroll wheel assembly, the overall volume of the pointing device fails to meet the growing requirement of minimization. In addition, the approach of laterally stirring the scroll wheel assembly may lead to excessive swing amplitude, and thus the scroll wheel assembly is hard to be precisely controlled.

SUMMARY OF THE INVENTION

As previously described, since the sensing member is typically arranged on bilateral sides or peripheries of the scroll wheel assembly, the overall volume of the pointing device fails to meet the increasing requirement of minimization. In addition, the approach of laterally stirring the scroll wheel assembly may lead to excessive swing amplitude, and thus the scroll wheel assembly is hard to be precisely controlled. In views of the above-described disadvantages resulted from the prior art, the applicant keeps on carving unflaggingly to develop a pointing device according to the present invention through wholehearted experience and research.

It is an object of the present invention to provide a pointing device capable of precisely controlling lateral movements of the cursor shown on the display screen without largely increasing overall volume of the pointing device.

In accordance with a first aspect of the present invention, there is provided a pointing device. The pointing device comprises a housing and a scroll wheel assembly. The housing has an opening therein. The scroll wheel assembly is positioned within the opening of the housing and a portion thereof protrudes away from the outer surface of the housing. The scroll wheel assembly comprises a rotatable member, a soft member covering the rotatable member, and a sensing member arranged between the rotatable member and the soft member. The sensing member is actuated in response to deformation of the soft member.

In accordance with a second aspect of the present invention, there is provided a pointing device communicated with a computer system for controlling movement of a cursor shown on a display screen of the computer system. The pointing device comprises a housing and a scroll wheel assembly. The scroll wheel assembly is positioned within the opening of the housing and a portion thereof protrudes away from the outer surface of the housing. The scroll wheel assembly comprises two rotor disks disposed on opposite sides of a shaft, a sensing member arranged between the two rotor disks, and a soft member covering the rotatable member and portions of the rotor disks. The sensing member is actuated to generate a leftward control signal to control a leftward movement of the cursor when a leftward external force is applied to deform the soft member. The sensing member is actuated to generate a rightward control signal to control a rightward movement of the cursor when a rightward external force is applied to deform the soft member.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 1 a schematic perspective view illustrating a pointing device according to the present invention;

FIG. 2A is a schematic exploded view illustrating a scroll wheel assembly of a pointing device according to a first preferred embodiment of the present invention;

FIG. 2B is a schematic partial enlarged cross-sectional view illustrating the scroll wheel assembly of FIG. 2A after be assembled;

FIGS. 2C~2E are schematic views illustrating leftward, rightward and downward movements of the scroll wheel assembly shown in FIG. 2B, respectively;

FIG. 3A is a schematic exploded view illustrating a scroll wheel assembly of a pointing device according to a second preferred embodiment of the present invention;

FIG. 3B is a cross-sectional view illustrating the scroll wheel assembly of FIG. 3A after be assembled;

FIG. 3C is a schematic partial enlarged view illustrating the scroll wheel assembly of FIG. 3A;

FIG. 4A is a schematic exploded view illustrating a scroll wheel assembly of a pointing device according to a third preferred embodiment of the present invention;

FIG. 4B is a schematic partial enlarged cross-sectional view illustrating the scroll wheel assembly of FIG. 4A after be assembled; and FIGS. 4C~4E are schematic views illustrating leftward, rightward and downward movements of the scroll wheel assembly shown in FIG. 4B, respectively.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention. In addition, the elements or structures in the drawings are not limited to the precise form disclosed. Unless specifically stated, the individual element may be extensive to include multiple elements or structures.

The present invention relates to a pointing device communicable to and a computer system or an electronic apparatus with a display screen, thereby outputting a control signal to control lateral movement of a cursor or scroll an image on the display screen.

Referring to FIG. 1, a schematic perspective view of a pointing device according to the present invention is shown. The pointing device 1 comprises a housing 10 and a scroll wheel assembly 11. The housing 10 has an opening 10A therein. The scroll wheel assembly 11 is positioned within the opening 10A of the housing 10, and a portion of the wheel 11 protrudes away from the outer surface of the housing 10 such that the scroll wheel assembly 11 can be contacted and manipulated by a user. The scroll wheel assembly 11 of the pointing device 1 can be rotated forwardly (as shown in the arrow F) or backwardly (as shown in the arrow B), thereby scrolling the image shown on the display screen upwardly and downwardly. In addition, the scroll wheel assembly 11 can be moved laterally when an external force is applied on the scroll wheel assembly 11 leftwards (as shown in the arrow L) or rightwards (as shown in the arrow R). In response to the external force, the scroll wheel assembly 11 is deformed such that a sensing member (not shown) within the housing 10 is actuated to generate a signal to control lateral movement of the cursor on the display screen.

Please refer to FIGS. 2A and 2B, which are a schematic exploded view and a partial enlarged cross-sectional view of a scroll wheel assembly used in the pointing device according to a first preferred embodiment of the present invention, respectively. The scroll wheel assembly 11 comprises a rotatable member, a soft member 111, a sensing member 112 and a lever member 115. The rotatable member includes two rotor disks 114A and 114B, which are disposed on opposite sides of a shaft 113. The soft member 111 can be contacted by the user's finger. The sensing member 112 is arranged between the rotatable member and the soft member 111. Moreover, the sensing member 112 is arranged between the rotor disks 114A and 114B, and includes three coplanar pressure sensing elements 112A, 112B and 112C. In this embodiment, the lever member 115 is in a shape of a trident, and includes three supporting posts 115A, 115B and 115C corresponding to the pressure sensing elements 112A, 112B and 112C, respectively. Once the scroll wheel assembly 11 is fabricated as shown in FIG. 2B, the sensing member 112, the lever member 115 and portions of the rotor disks 114A and 114B are covered by the soft member 111.

The principle of controlling lateral movement of the cursor in response to the control signal generated from stirring actions of the scroll wheel assembly 11 will be illustrated with reference to FIGS. 2C and 2D. When an external force is applied on the soft member 111 leftwards (as shown in the arrow L) or rightwards (as shown in the arrow R), the lever member 115 is inclined to the left or right side, respectively. Under this circumstance, the pressure sensing elements 112A and 112C are actuated by corresponding supporting posts 115A and 115C so as to generate corresponding control signals for controlling leftward and rightward movement of the cursor, respectively. Furthermore, once the user depresses down the soft member 111 in the direction D, as shown in FIG. 2E, the lever member 115 would be pressed down such that the central pressure sensing element 112B is actuated by corresponding supporting post 115B. Under this circumstance, the pointing device would generate a setting signal for conducting other data processing operations.

A second embodiment of a pointing device is also communicable to a computer system or an electronic apparatus with a display screen, thereby controlling lateral movement of a cursor or scrolling an image on the display screen in response to a control signal. The scroll wheel assembly 21 used in this embodiment will be illustrated with reference to FIGS. 3A~3C. As shown in FIG. 3A, the scroll wheel assembly 21 comprises a rotatable member, a soft member 211 and a sensing member 212. The rotatable member includes two rotor disks 214A and 214B disposed on opposite sides of a shaft 213 and made of flexible material. The soft member 211 can be contacted by the user's finger. The sensing member 212 is arranged between the rotatable member and the soft member 211. Once the scroll wheel assembly 21 is fabricated as shown in FIG. 3B, the sensing member 212 and portions of the rotor disks 214A and 214B are covered by the soft member 211.

FIG. 3B is a cross-sectional view illustrating the scroll wheel assembly of the pointing device according to this embodiment. The sensing member 212 includes two pressure sensing elements 212A and 212B facing to the rotor disks 214A and 214B, respectively. The pressure sensing elements 212A and 212B may be in contact with the rotor disks 214A and 214B, respectively, as shown in FIG. 3B. Alternatively, the pressure sensing elements 212A and 212B may be slightly distant from the rotor disks 214A and 214B, respectively, as long as the distance between the pressure sensing element 212A and the rotor disk 214A and the distance between the pressure sensing element 212B and the rotor disk 214B are within the deformable ranges of the rotor disks 214A and 214B.

The principle of controlling lateral movement of the cursor according to the control signal generated from stirring actions of the scroll wheel assembly 21 will be illustrated with reference to FIGS. 3B and 3C. When an external force is applied on the soft member 211 leftwards (as shown in the arrow L), the rotor disk 214B is inclined to the left such that the pressure sensing element 212B is actuated by the rotor disk 214B to generate corresponding control signal for controlling the leftward movement of the cursor. Whereas, when an external force is applied on the soft member 211 rightwards (as shown in the arrow R), the rotor disk 214A is inclined to the right such that the pressure sensing element 212A is actuated by the rotor disk 214A to generate corresponding control signal for controlling the rightward movement of the cursor. Optionally, the sensing member 212 further includes an additional pressure sensing element 212C arranged on the top surface thereof and in contact with the central inner wall 211A of the soft member 211. Alternatively, the pressure sensing element 212C may be slightly distant from the inner wall 211A as long as the distance therebetween is within the deformable range of the soft member 211. Once the user depresses down the soft member 211 in the direction D, as shown in FIG. 3B, the soft member 211 is pressed down such that the pressure sensing element 212C is actuated to generate a setting signal for conducting other data processing operations.

A third embodiment of a pointing device is also communicable to a computer system or an electronic apparatus with a display screen, thereby controlling lateral movement of a cursor or scrolling an image on the display screen in response to a control signal. The scroll wheel assembly 31 used in this embodiment will be illustrated with reference to FIGS. 4A~4E. As shown in FIG. 4A, the scroll wheel assembly 31 comprises a rotatable member, a soft member 311 and a sensing member 312. The rotatable member includes two rotor disks 314A and 314B disposed on opposite sides of a shaft 313. The soft member 311 can be contacted by the user's finger. The sensing member 312 is arranged between the rotatable member and the soft member 311. Once the scroll wheel assembly 31 is fabricated as shown in FIG. 4B, the sensing member 312 and portions of the rotor disks 314A and 314B are covered by the soft member 311.

The sensing member 312 includes two pressure sensing elements 312A and 312B facing to and in contact with opposite inner walls 311A and 311B of the soft member 311, respectively. Alternatively, the pressure sensing elements 312A and 312B may be slightly distant from the inner walls 311A and 311B of the soft member 311, respectively, as long as the distance between the pressure sensing element 312A and the inner wall 311A and the distance between the pressure sensing element 312B and the inner wall 311B are within the deformable ranges of the inner walls 311A and 311B of the soft member 311. The principle of controlling lateral movement of the cursor according to the control signal generated from stirring actions of the scroll wheel assembly 31 will be illustrated with reference to FIGS. 4C and 4D. When an external force is applied on the soft member 311 leftwards (as shown in the arrow L), the pressure sensing element 312B is actuated by the inner wall 311B of the soft member 311 to generate corresponding control signal for controlling the leftward movement of the cursor. Whereas, when an external force is applied on the soft member 311 rightwards (as shown in the arrow R), the pressure sensing element 312A is actuated by the inner wall 311A of the soft member 311 to generate corresponding control signal for controlling the rightward movement of the cursor.

Optionally, the sensing member 312 further includes an additional pressure sensing element 312C arranged on the top surface thereof and in contact with the inner wall 311C of the soft member 311. Alternatively, the pressure sensing element 312C may be slightly distant from the inner wall 311C as long as the distance therebetween is within the deformable range of the soft member 311. Once the user depresses down the soft member 311 in the direction D, as shown in FIG. 4E, the soft member 311 is pressed down such that the pressure sensing element 312C is actuated to generate a setting signal for conducting other data processing operations.

From the above description, the pointing device of the present invention can be integrated with or applied to a keyboard, a mouse, a remote controller or any regular input device. In addition, the pointing device of the present invention is communicable to a computer system or an electronic apparatus with a display screen, for example a mobile phone, a personal digital assistant (PDA) or a notebook, so as to scroll an image on a display screen, control lateral movement of a cursor, and generate a setting signal to conduct data processing operations such as dragging or selecting operations.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pointing device comprising:
a housing having an opening therein; and
a scroll wheel assembly positioned within said opening of said housing and a portion thereof protruding away from the outer surface of said housing, and comprising a rotatable member, a soft member covering said rotatable member, and a sensing member arranged between said rotatable member and said soft member, wherein said sensing member includes three coplanar pressure sensing elements and a lever member having three posts proximate a first end thereof each positioned over one of the three coplanar pressure sensing elements, the lever having a second end engaging an inner surface of the soft member and selectively deflected according to a change in shape of the soft member responsive to an external force.

2. A pointing device comprising:
a housing having an opening therein;
a scroll wheel assembly positioned within said opening of said housing and a portion thereof protruding away from the outer surface of said housing, and comprising a rotatable member, a soft member covering said rotatable member, and a sensing member arranged between said rotatable member and said soft member, wherein said sensing member is actuated in response to deformation of said soft member;
wherein said rotatable member includes two rotor disks disposed on opposite sides of a shaft.

3. A pointing device comprising:
a housing having an opening therein; and
a scroll wheel assembly positioned within said opening of said housing and a portion thereof protruding away from the outer surface of said housing, and comprising a rotatable member, a soft member covering said rotatable member, and a sensing member arranged between said rotatable member and said soft member, wherein said sensing member is actuated in response to a change in shape of said soft member;
wherein said sensing member includes two pressure sensing elements facing to opposite inner walls of said soft member, respectively.

4. The pointing device according to claim 2 wherein said sensing member includes two pressure sensing elements facing to said two rotor disks, respectively.

5. The pointing device according to claim 4 wherein said two rotor disks are made of flexible material.

6. A pointing device communicated with a computer system for controlling movement of a cursor shown on a display screen of said computer system, said pointing device comprising:
a housing having an opening therein; and
a scroll wheel assembly positioned within said opening of said housing and a portion thereof protruding away from the outer surface of said housing, and comprising two rotor disks disposed on opposite sides of a shaft, a sensing member arranged between said two rotor disks, and a soft member covering said rotatable member and portions of said rotor disks, wherein said sensing member is actuated to generate a leftward control signal to control the leftward movement of said cursor when a leftward external force is applied to deform said soft member, and said sensing member is actuated to generate a rightward control signal to control the rightward movement of said cursor when a rightward external force is applied to deform said soft member.

7. The pointing device according to claim 6 wherein said sensing member includes three coplanar pressure sensing elements, and said pointing device further comprises a lever member in a shape of a trident corresponding to said pressure sensing elements and arranged between said sensing member and said soft member, wherein the pressure sensing element at the left side is actuated by said lever member to generate said leftward control signal to control the leftward movement of said cursor when said leftward external force is applied to deform said soft member, and the pressure sensing element at the right side is actuated by said lever member to generate said rightward control signal to control the rightward movement of said cursor when said rightward external force is applied to deform said soft member.

8. The pointing device according to claim 7 wherein the pressure sensing element at the central position is actuated by said lever member to generate a setting signal when a downward external force is applied on said soft member.

9. The pointing device according to claim 6 wherein said two rotor disks are made of flexible material.

10. The pointing device according to claim 9 wherein said sensing member includes two lateral pressure sensing elements facing to said two rotor disks, respectively, wherein one of said lateral pressure sensing elements is actuated to generate a leftward control signal to control the leftward movement of said cursor when a leftward external force is applied to deform said soft member, and the other one of said lateral pressure sensing elements is actuated to generate a rightward control signal to control the rightward movement of said cursor when a rightward external force is applied to deform said soft member.

11. The pointing device according to claim 6 wherein said sensing member includes two lateral pressure sensing elements facing to opposite inner walls of said soft member, respectively, wherein one of said lateral pressure sensing elements is actuated to generate a leftward or rightward control signal to control the leftward or rightward movement of said cursor when an external force is applied to deform said inner walls of said soft member.

12. The pointing device according to claim 6 wherein said sensing member includes a central pressure sensing element arranged on the top surface thereof and facing to the central inner wall of said soft member, wherein said central pressure sensing element is actuated to generate a setting signal when a downward external force is applied on said soft member.

13. A pointing device comprising:
a housing having an opening therein;
scroll wheel rotatably mounted to a shaft;
means for sensing rotating of the scroll wheel about the shaft; and means for sensing tilting of the scroll wheel; wherein the scroll wheel comprises two rotor disks rotatably mounted to the shaft and a soft member extending between the two rotor disks and circumferentially around the rotor disks; wherein the means for sensing is positioned between the two rotor disks; wherein the means for sensing comprises two lateral pressure sensing elements facing the two rotor disks, respectively.

14. The pointing device according to claim 13 wherein, the two rotor disks are made of flexible material.

15. A pointing device comprising:
a housing having an opening therein;
a scroll wheel rotatably mounted within said opening having a portion thereof protruding outwardly from an outer surface of said housing;
a lever having a proximal end secured proximate a perimeter of the scroll wheel, a distal end projecting outwardly from the scroll wheel;
a soft member extending circumferentially around the scroll wheel, extending over the lever, and secured to the scroll wheel on either side of the proximal end of the lever, the soft member changing shape in response to an external force to selectively engage the distal end of the lever to rotate the lever; and
a sensor engaging the lever to detect rotation of the lever.

16. The pointing device of claim 15, wherein the lever comprises three posts secured to the distal end and wherein the sensor includes three pressure sensors each positioned to engage one of the three posts in response to movement of the lever.

* * * * *

UNITED STATES PATENT AND TRADEMARK OFFICE
CERTIFICATE OF CORRECTION

| | | |
|---|---|---|
| PATENT NO. | : 7,525,532 B2 | Page 1 of 1 |
| APPLICATION NO. | : 11/203691 | |
| DATED | : April 28, 2009 | |
| INVENTOR(S) | : Sen-Hsiang Liu et al. | |

It is certified that error appears in the above-identified patent and that said Letters Patent is hereby corrected as shown below:

Column 8
Line 3 claim 13, insert --a-- before "scroll"

Signed and Sealed this

Twenty-first Day of July, 2009

JOHN DOLL
*Acting Director of the United States Patent and Trademark Office*